F. R. F. RICHTER.
PNEUMATIC CUSHION AND SHOCK ABSORBER.
APPLICATION FILED FEB. 13, 1913.
1,135,925.  Patented Apr. 13, 1915.
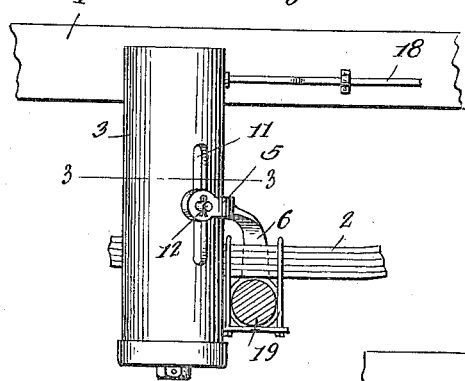
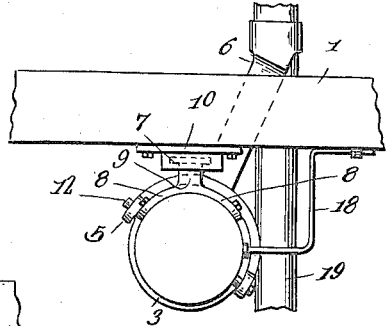
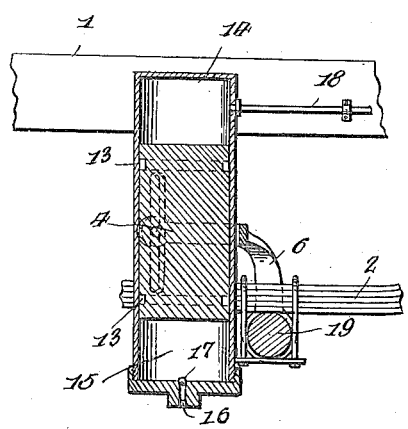
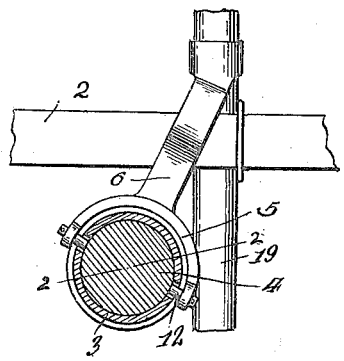
WITNESSES
INVENTOR
Fred Richard Frans Richter
his Attorney

UNITED STATES PATENT OFFICE.

FRED R. F. RICHTER, OF NIVERVILLE, NEW YORK.

PNEUMATIC CUSHION AND SHOCK-ABSORBER.

1,135,925.        Specification of Letters Patent.      Patented Apr. 13, 1915.

Application filed February 13, 1913. Serial No. 748,207.

*To all whom it may concern:*

Be it known that I, FRED RICHARD FRANS RICHTER, subject of the Emperor of Germany, residing at Niverville, in the county of Columbia and State of New York, have invented certain new and useful Improvements in Pneumatic Cushions and Shock-Absorbers, of which the following is a specification.

My invention relates to vehicles and has particular reference to resilient body supports.

The primary object of my invention resides in the provision of a pneumatic cushion for vehicles which will also act as a shock absorber.

A further object is the provision of a combined pneumatic cushion and shock absorber which will act as a body support when the vehicle is proceeding over a normally level surface but which will also act as a shock absorber when sudden bumps or shocks are transmitted to the vehicle through unevenness in the road, rocks and other foreign material common to the road beds of this country.

The above and additional objects are accomplished by such means as are shown in their preferred embodiment in the accompanying drawing described in the following specification and then more particularly pointed out in the claim which is appended hereto and forms a part of this application.

With reference to the drawing: Figure 1 is a side elevation showing my device in its assembled relation to the transverse axis of the vehicle axle. Fig. 2 is a longitudinal section on the line 2—2 of Fig. 3. Fig. 3 is a section on the line 3—3 of Fig. 1. Fig. 4 is a top plan view of my device shown in its assembled relation to the axle and frame members of the vehicle.

Proceeding now to the description of the drawing wherein I have illustrated the preferred embodiment of my invention and wherein similar reference numerals designate corresponding parts throughout the several views, the numeral 1 designates a side member of a vehicle, and the numeral 2 indicates a spring, of the ordinary type, connected thereto.

In general my invention includes the cylindrical casing 3, the piston 4 mounted therein and the connecting yoke and arms 5 and 6. The casing 3 is rigidly connected to the member 1 by the supporting member 7 which as disclosed in the drawing consists of the arcuate yoke arms 8, stock 9 and securing plate 10, the latter member being bolted or otherwise secured to the member 1. The casing 3 is provided with the diametrically opposed longitudinally extending slot 11 wherein the guide lugs 12, carried by the piston 4, are seated for vertical sliding movement. The piston 4 is provided with the packing glands 13 to prevent the escape of air from the chambers 14 and 15. The lower end of the casing 3 carries a screw threaded cap which is provided with a central opening 16 in which is seated the inwardly movable ball valve 17. At its upper end the wall of the casing 3 is provided with an internally screw threaded bore wherein is mounted the air supply pipe 18. The yoke arms 5 are perforated adjacent their free end and are pivotally connected to the piston head by means of the members 12. The arm 6 is formed integrally with the yoke arms 5 and is secured to the vehicle axle 19 in any suitable manner.

Before proceeding to the description of the operation of my invention, it is desirable to reiterate that the primary object is to provide a combined pneumatic cushion and shock absorber.

As to the operation of the device as a pneumatic cushion: The chamber 14 serves as a compressed air container, the air being introduced through the pipe 18. It will be apparent that the pressure within the chamber 14 may be so regulated that practically all the weight of the car will be supported directly by the axle and not entirely through the medium of the spring as heretofore. For example, let us presume that the device is employed on an automobile, the weight of which is 900 pounds. Now if the compressed air tank with which the pipe 18 communicates contains air at a pressure of 100 pounds and the cylinder 3 has an approximate diameter of 4″ the approximate pressure on the piston head will be 900 pounds. An effective pneumatic cushion is therefore provided.

In regard to the operation of the device as a shock absorber: When a rock or similar obstruction is encountered by the wheel of the vehicle, the spring 2 will naturally move upwardly toward the member 1 of the car and consequently moving the piston correspondingly, thereby enlarging the capacity of the chamber 15. As a result, a partial vacuum will be created within the chamber 15 and atmospheric pressure will open the valve, thus filling chamber 15 with air. On the reaction of the spring 2, the piston will be pulled downwardly, but on this downward movement the valve will be closed and the movement of the piston will be retarded by the compression of the air within the container 15.

Since the essential feature of an effective shock absorber is the provision of means which will counteract the reaction of the vehicle spring, it will be seen that my device will effectively accomplish the desired result.

It will, of course, be understood that the accompanying drawing and above description comprehend only the general and preferred embodiment of my invention and that various minor changes in details of construction and arrangement of parts may be made within the scope of the appended claim and without sacrificing any of the advantages of this invention.

What is claimed is:

In a shock absorber, the combination with a vehicle frame, of a spring, a cylinder having diametrically disposed longitudinal slots formed therein, a piston operative within said cylinder, an axle, a yoke having one end thereof secured to said axle and a portion thereof bridging over said spring and the opposite end thereof directly connected to said piston and an air supply pipe connected to said cylinder and carried by said vehicle frame.

In testimony whereof I affix my signature in presence of two witnesses.

FRED R. F. RICHTER.

Witnesses:
EDWARD S. GREGORY,
HANS H. RICHTER.

Copies of this patent may be obtained for five cents each, by addressing the "Commissioner of Patents, Washington, D. C."